United States Patent
Gower (10) Patent No.: US 9,075,750 B2
(45) Date of Patent: Jul. 7, 2015

(54) ORACLE REWIND: METADATA-DRIVEN UNDO

(71) Applicant: Oracle International Corporation, Redwood Shores, CA (US)

(72) Inventor: Stefan Gower, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/911,875

(22) Filed: Jun. 6, 2013

(65) Prior Publication Data

US 2013/0275388 A1   Oct. 17, 2013

Related U.S. Application Data

(63) Continuation of application No. 13/300,545, filed on Nov. 18, 2011, now Pat. No. 8,484,166.

(60) Provisional application No. 61/555,443, filed on Nov. 3, 2011.

(51) Int. Cl.
*G06F 17/30* (2006.01)
*G06F 11/14* (2006.01)

(52) U.S. Cl.
CPC ........ *G06F 11/1412* (2013.01); *G06F 11/1474* (2013.01); *G06F 2201/80* (2013.01)

(58) Field of Classification Search
CPC .......... G06F 17/30377; G06F 11/0793; G06F 9/466; G06F 17/30371; G06F 17/30286
USPC .................................................. 707/678, 684
See application file for complete search history.

(56) References Cited

U.S. PATENT DOCUMENTS

| | | | |
|---|---|---|---|
| 6,158,044 A | 12/2000 | Tibbets | |
| 6,584,477 B1 * | 6/2003 | Mosher, Jr. | 707/610 |
| 6,748,550 B2 | 6/2004 | McBrearty et al. | |
| 6,785,722 B2 * | 8/2004 | Vuong et al. | 709/223 |
| 6,895,529 B2 | 5/2005 | Egolf et al. | |
| 7,234,076 B2 | 6/2007 | Daynes et al. | |
| 7,499,953 B2 * | 3/2009 | Krishnaswamy et al. | 1/1 |

(Continued)

FOREIGN PATENT DOCUMENTS

WO   WO2011123924 A1   10/2011

OTHER PUBLICATIONS

Brown "Rewind, Repair, Replay: Three R's to cope with operator error," presentation to IBM Research-Almaden available at http://roc.cs.berkeley.edu/talks/pdf/undo-ibm-02Mar.pdf (Mar. 2002).

(Continued)

*Primary Examiner* — Thanh-Ha Dang
(74) *Attorney, Agent, or Firm* — Kilpatrick Townsend & Stockton LLP (57) ABSTRACT

Metadata-driven undo is described. In an embodiment, a metadata repository stores metadata that is associated with operations. Attributes associated with each operation are also stored in the metadata. Each operation is associated with an undolet that includes instructions for generating undo entries for operations of a particular operation type. Undo log entries are generated using the metadata and the undolet when a request is intercepted that includes an undoable operation. When an undo command is issued, the instructions in the undo log that are associated with a particular business transaction are executed to "rewind" the transaction.

21 Claims, 5 Drawing Sheets

(56) References Cited

U.S. PATENT DOCUMENTS

| | | | |
|---|---|---|---|
| 7,571,352 B2 | 8/2009 | Weichselbaum | |
| 7,660,832 B2 | 2/2010 | Nomoto et al. | |
| 7,668,961 B2 * | 2/2010 | Lomet | 709/230 |
| 8,001,091 B2 | 8/2011 | Allen et al. | |
| 8,010,559 B2 | 8/2011 | Verma et al. | |
| 8,037,169 B2 | 10/2011 | Macnaughton et al. | |
| 8,209,603 B2 * | 6/2012 | Bailor et al. | 715/255 |
| 8,250,029 B2 * | 8/2012 | Holenstein et al. | 707/615 |
| 2003/0208500 A1 | 11/2003 | Daynes et al. | |
| 2004/0030954 A1 | 2/2004 | Loaiza et al. | |
| 2004/0205663 A1 * | 10/2004 | Mohamed | 715/530 |
| 2006/0230311 A1 * | 10/2006 | Kao et al. | 714/16 |
| 2007/0038756 A1 * | 2/2007 | Waldorf et al. | 709/227 |
| 2007/0112885 A1 * | 5/2007 | Farr | 707/202 |
| 2007/0128899 A1 | 6/2007 | Mayer | |
| 2008/0040588 A1 * | 2/2008 | Ukigawa et al. | 712/228 |
| 2008/0115123 A1 * | 5/2008 | Kelly et al. | 717/177 |
| 2008/0162590 A1 | 7/2008 | Kundu et al. | |
| 2009/0106329 A1 * | 4/2009 | Masuda | 707/202 |
| 2010/0218195 A1 | 8/2010 | Adl-Tabatabai et al. | |
| 2010/0332449 A1 * | 12/2010 | Holenstein et al. | 707/615 |
| 2012/0030184 A1 * | 2/2012 | Driesen et al. | 707/703 |
| 2012/0059792 A1 | 3/2012 | Kundu et al. | |
| 2013/0097136 A1 * | 4/2013 | Goldberg | 707/704 |

OTHER PUBLICATIONS

Notice of Allowance for U.S. Appl. No. 13/300,545, mailed Nov. 27, 2012, 14 pages.

Second Notice of Allowance for U.S. Appl. No. 13/300,545, mailed Mar. 13, 2012, 5 pages.

International Preliminary Report on Patentability for International PCT Application No. PCT/US2012/062610, mailed Aug. 7, 2014, 8 pages.

International Search and Written Opinion for PCT application PCT/US12/62610 (Jul. 21, 2014).

* cited by examiner

ORACLE REWIND: METADATA-DRIVEN UNDO

CROSS-REFERENCES TO RELATED APPLICATIONS

The present application is a continuation of U.S. patent application Ser. No. 13/300,545, filed Nov. 18, 2011, which claims the benefit of priority under 35 U.S.C. 119(e) of U.S. Provisional Application No. 61/555,443, filed Nov. 3, 2011. The entire contents of the Ser. No. 13/330,545 and 61/555,443 U.S. Patent Applications are incorporated herein by reference.

BACKGROUND OF THE INVENTION

Modern computing systems often provide the ability to "undo" certain operations. This is because computer operators or the programs they use sometimes make mistakes. When mistakes happen, the operator may want to go back to a known state and try again. A variety of actions can lead to these mistakes. For example, programmers sometimes fail to recognize that a computing system will be used in a particular way. When the programmer has not tested for a particular use-case, a user may introduce errors into the system. In more complicated business transactions, it is common for many changes to be made over a variety of computing systems. If a change is made to one of these computing systems after such a multi-step business transaction begins, but before it ends, inconsistencies may be introduced into the system. This is especially problematic when the intervening change involves a security inconsistency with other changes made in the business transaction.

Some database systems have an advantage when it comes to ensuring consistency during database transactions. This is especially true of databases that implement ACID transactions, such as database systems provided by Oracle Corporation. ACID stands for Atomicity, Consistency, Isolation, and Durability. In database computing, atomicity means that if a sequence of changes are made within a single database transaction, either all of the changes will be made or none of the changes will be made at all. In other words, ACID transactions take an "all or nothing" approach. Thus, database systems can ensure that an entire transaction will be successful before committing that transaction.

Other computing systems do not have the luxury of the consistency provided by database systems. For example, LDAP (Lightweight Directory Access Protocol) based systems do not have built-in consistency checks before committing changes. Web services and other systems also commit changes as they are provided, even if those systems use databases to store information. For example, one of the changes required by a business transaction may be an update request to a web service. Although the web service may store data in a modern database, that database is unaware of any other changes required by the business transaction because only one change at a time is requested through the web service, and the web service merely makes changes as they are requested. The database then commits each transaction provided to the database in turn, even though other steps are required to complete the overall business transaction.

In the example provided above, it is possible that one of the operations will fail. For example, the business transaction may require thirteen separate steps to be taken, and the twelfth step may fail, causing an inconsistency over the systems. Such an inconsistency is problematic within a single system, but business transactions may require steps to be taken over multiple systems, compounding the problem.

One potential solution to this problem is to program special-purpose "undo" logic for each system or service for which undo capability is desired. However, maintaining hard-coded undo logic within a changing system is difficult, and often leads to errors. In addition, labor costs are too high. Writing undo logic to perform all of the necessary operations to rewind a failing business transaction is complex, and becomes very difficult as the number of operations that need to be dynamically generated by the logic increases. In addition, undo logic implemented in this way becomes invalid each time the service changes, resulting in a need for the code to be re-written.

What is needed is a general-purpose undo system that provides undo functionality for business transactions that occur outside of the comfort of a database transaction.

DETAILED DESCRIPTION OF THE INVENTION

Metadata-driven undo is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Metadata-Driven Undo
3.1 Metadata
3.2 Undo Log
3.3 Undolets
3.4 Performing Metadata-Driven Undo
3.5 Undo Policies
3.6 Suspending the Undo Engine
4.0 Implementation Mechanisms—Hardware Overview

1.0 General Overview

Metadata-driven undo is described. In an embodiment, a metadata repository stores metadata that is associated with operations. For example, the metadata may identify the type of operation, such as whether the operation is a setter, getter, constructor, destructor, adder, remover, or other type of operation. Attributes associated with each operation and/or operation type are also stored in the metadata. Each operation is associated with an undolet that includes instructions for generating undo entries. The undolet can handle any invocation on any operation belonging to that type of operation (e.g., constructor, destructor) without regard to the target system. Undo logic generates entries in an undo log based on the metadata in the metadata repository, and the undolet. In an embodiment, undo entries are generated based on queries to the target system. An entry in the undo log may be based on an operation in a request that is intercepted by the system, and may include an attribute value for an attribute associated with the operation. When an undo command is issued, the instructions in the undo log that are associated with a particular business transaction are executed. If the undo instructions are executed successfully, the state of the systems involved in the business transaction will return to a pre-transaction state with respect to the objects associated with the business transaction.

2.0 Structural and Functional Overview

Figure 1A:
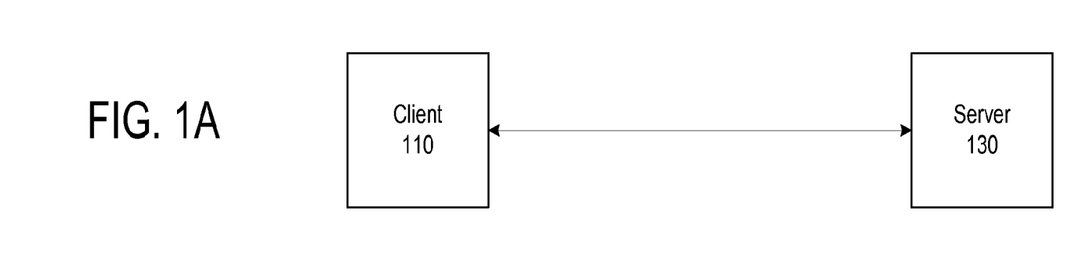
FIG. 1A illustrates a logical block diagram of a computing environment in which an embodiment may be implemented.

FIG. 1A illustrates a logical block diagram of a computing environment in which an embodiment may be implemented. A client 110 represents a computing system capable of making requests or otherwise interacting with another computing system or computer process. Client 110 may also represent a process that is executing on a computing device. For example, client 110 and server 130 may represent processes that are running on the same computing device. Client 120 is configured with logic and instructions which, when executed, cause one or more requests to be sent to server 130. Server 130 represents a computing system or a process on a computing system that is configured to perform operations in response to requests made by other processes, computing devices, or other entities, such as client 110, in accordance with server logic and stored instructions. For example, client 110 may send an update request that includes a request to update the role of a user associated with a financial accounting system. In response to receiving this request, server 130 may generate an update to issue to a database in order to update the role of the user in accordance with the instructions provided by client 110.

Figure 1B:
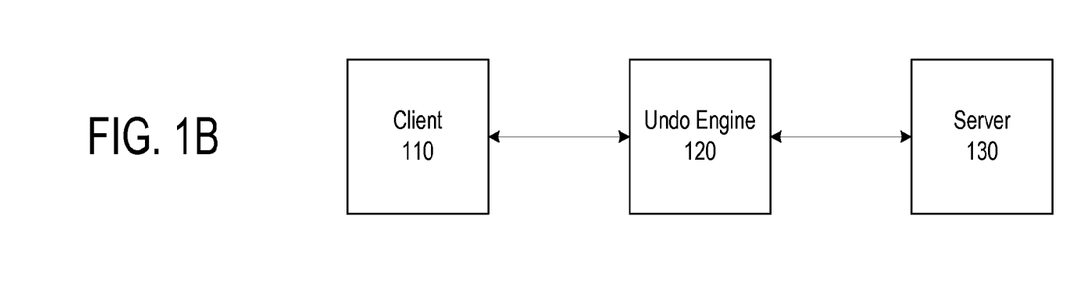
FIG. 1B illustrates a logical block diagram showing an undo engine positioned as an intermediary between a client and a server in an embodiment.

FIG. 1B illustrates a logical block diagram showing an undo engine 120 positioned as an intermediary between client 110 and a server 130 in an embodiment. Undo engine 120 intercepts communications between a requesting entity and a request-granting entity, such as client 110 and server 130, respectively. In an embodiment, undo engine may be an extension of server 130, may be completely integrated into server 130, or may operate on a separate computing device from server 130. In an embodiment, undo engine may be an extension of client 110, may be completely integrated into client 110, or may operate on a separate computing device from client 110. Undo engine 120 includes logic for performing undo operations in response to an undo request from client 110. For example, assuming a previous request sent by client 110 to update the role of a user associated with a financial accounting system has been carried out by server 130, a subsequent request may be sent by client 110 to undo the changes made by the previous request. Undo engine 120 receives the request from client 110, and causes the user to be associated with his earlier role, as though the previous request had never been executed.

Figure 2:
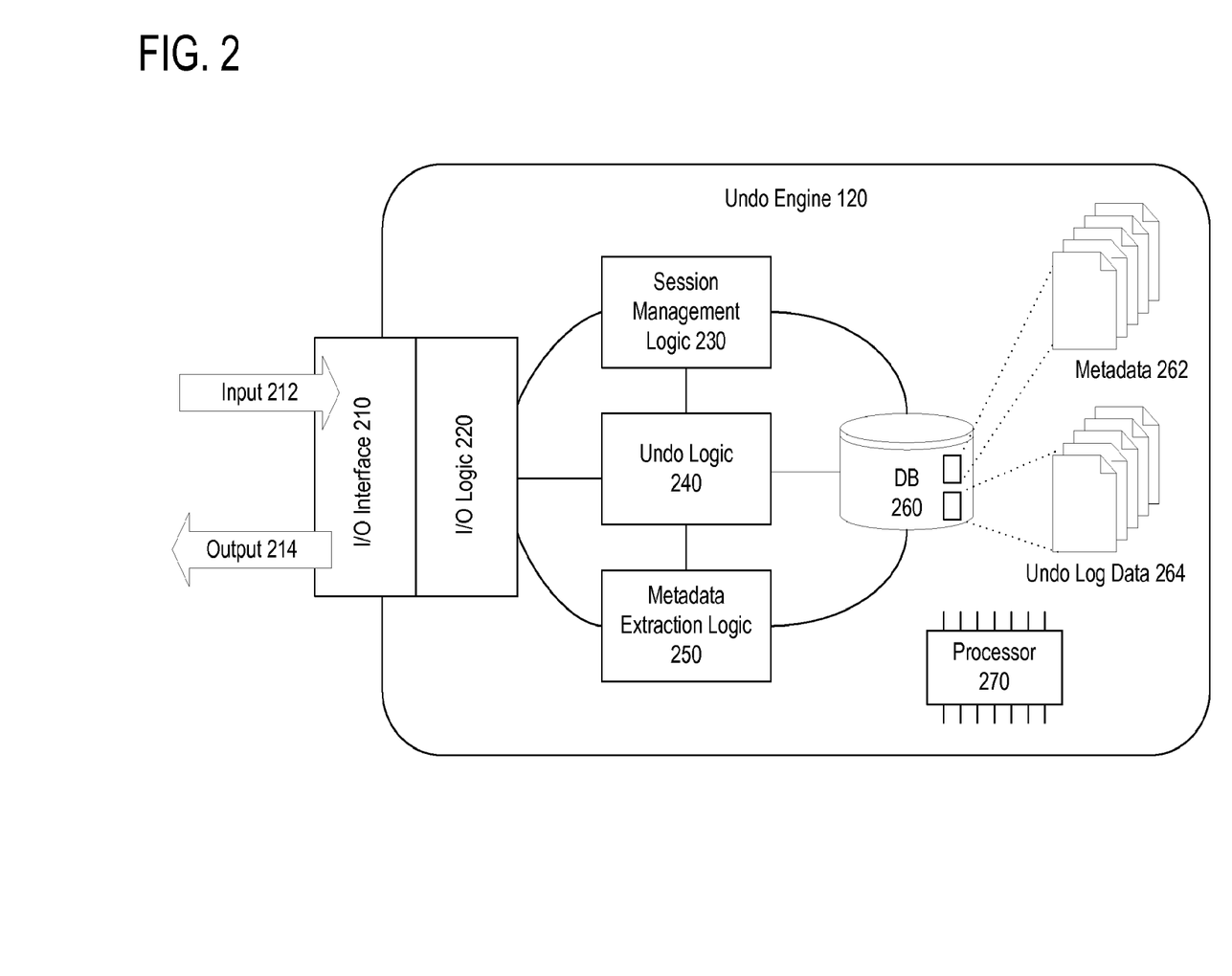
FIG. 2 illustrates a logical block diagram of an undo engine in an embodiment.

FIG. 2 illustrates a logical block diagram of an undo engine in an embodiment. Undo engine 120 includes input/output (I/O) interface 210. I/O interface 210 may be configured to couple to a network, user input device, or other device or means of providing signals or data as input 210. I/O interface 210 may also be configured to couple to a network, output display device, or transmission media device capable of transmitting or displaying output 214. Input signals or data 212 may include a request from client 110 to server 130 that is intercepted by undo engine 120. For example, input 212 may include a request to change a role associated with a user on server 130 or another computing system. The request may include the new role, as well as the user for which the role is to be set. Input 212 may also include a response from server 130 to client 110 that is intercepted by undo engine 120. For example, input 212 may include a message confirming that the role has been successfully changed. Output 214 may include a message to server 130. For example, a message that is intercepted by undo engine 120 may be forwarded, with or without alterations, to server 130. Output 214 may also include a response to client 110, indicating the success or failure of a request, such as a request to set or change a role associated with a user. Other output may include network management messages sent to network management software or user interface output, in an embodiment.

Undo engine 120 includes I/O logic 220 configured to receive input 212 from I/O interface 210. I/O logic 220 may be configured to store input 212 or information associated with input 212 in non-transitory media, such as volatile or non-volatile storage media. For example, I/O logic 220 may include logging logic. I/O logic 220 is communicatively coupled to I/O interface 210, processor 270, a session management logic 230, undo logic 240, and a metadata extraction logic 250 in the embodiment shown in FIG. 1. In other embodiments, additional elements of undo engine may be coupled to I/O logic 220.

Session management logic 230, undo logic 240, and metadata extraction logic 250 are all coupled to a processor 270 and a database 260 or other storage in an embodiment. Session management logic 230 is configured to determine which requests are associated with one another. For example, session management logic 230 may store a log of requests and session identifiers in database 260, and/or pass session information to undo logic 240. Session identifiers may be assigned by session management logic 230, or may be determined by extracting session identification information from intercepted requests. Session information may be removed from requests before the requests are forwarded to the intended recipient, in an embodiment. In an embodiment, session management logic is configured to manage asynchronous processing of requests. For example, when undo engine acts as an intermediary, session management logic 230 keeps track of requests and processes them in the order in which they were received, even if session management logic 230 must wait for callback notifications from a server to which a request has been made before moving on to the next request. If a timeout or other event occurs, an undo policy may be invoked to cause undo engine 120 to handle the timeout according to the undo policy instructions. For example, a policy may cause all operations associated with a session to be undone if a timeout occurs during one of the operations.

Metadata extraction logic 250 automatically extracts metadata from services that have been extended to support undo functionality in an embodiment. For example, comments such as Java annotations or other metadata may be included in an Mbean or other object. These comments may provide relationship information that defines a relationship between operation. For example, a operation such as setName(person, name) is considered a "setter" because it sets a value. The object may have a related "getter" getName(person) that is used to check the current name value for a person. The setName( )operation may be identified in metadata as an "undoable" operation, and the type of operation may be set to "getter" to indicate that the way to undo an operation using that operation is to use the same operation to set the previous value for the person.

Metadata gathered from services need not be limited to getters and setters. Constructors and destructors, as well as other types of undoable operation can be identified by metadata. In addition, read-only and operations that are not undoable can also be defined in metadata table 262 in an embodiment. Metadata is stored in a database table such as the metadata table 262 in an embodiment. Metadata table 262 includes a mapping from operation types to operations extracted by metadata extraction logic 250 in an embodiment.

Metadata table 262 also includes data identifying the parameter type of each operation. For example, an operation may have different types of parameters, such as "KEY" parameters, "SELECTOR" parameters, and "DATA" parameters. KEY parameters are used for identification. For example, the parameter named "SSN" might be KEY, as it could be used to identify a person. Note: zero, one or more parameters on the same operation can be KEY. SELECTOR parameters are associated with selection. For example, in the operation setOffice(int officeNumber,String employeeNumber), the parameter named officeNumber is being used to select an office, and is therefore a selector. DATA parameters are used as data, and can include any data value.

In an embodiment, metadata table 262 may be populated and updated manually or dynamically, or using a combination of manual and automatic operations. In other embodiments, metadata may be stored on any form of volatile or non-volatile computer-readable storage, using any data file type or storage system. For example metadata may be stored in flat files or XML files on a shared hard-disk array or in memory such as memory 506.

Undo logic 240 is configured to generate and execute undo instructions in an embodiment. Undo logic receives an intercepted request for an operation to be performed. For example, the operation may be a request to update a particular value associated with a web service application. Undo logic 240 receives session information from session management logic 230, and stores a series of undo instructions for one or more sessions. In an embodiment, undo logic 240 stores undo instructions for each session identified by session management logic 230. Undo instructions are stored in an undo log data database table 264 in an embodiment. In other embodiments, undo instructions are stored in memory, such as volatile memory or non-volatile memory other than database 260. Undo instructions that are generated for a session, when executed by one or more processors, cause the values changed by the operations in the corresponding session to be undone. For example, a value changed by a session would return to the original value if the undo instructions associated with that session were executed successfully.

Elements not shown in FIG. 2 may be added in other embodiments, and the configuration of elements of the computing system may differ from the configuration shown in FIG. 2. For example, I/O logic 220 may be incorporated into undo logic 240, and database 260 may be remotely connected to undo engine 220. Processor 270 may comprise hardware logic in the form of one or more central processing units (CPUs) each having one or more cores.

Figure 3:
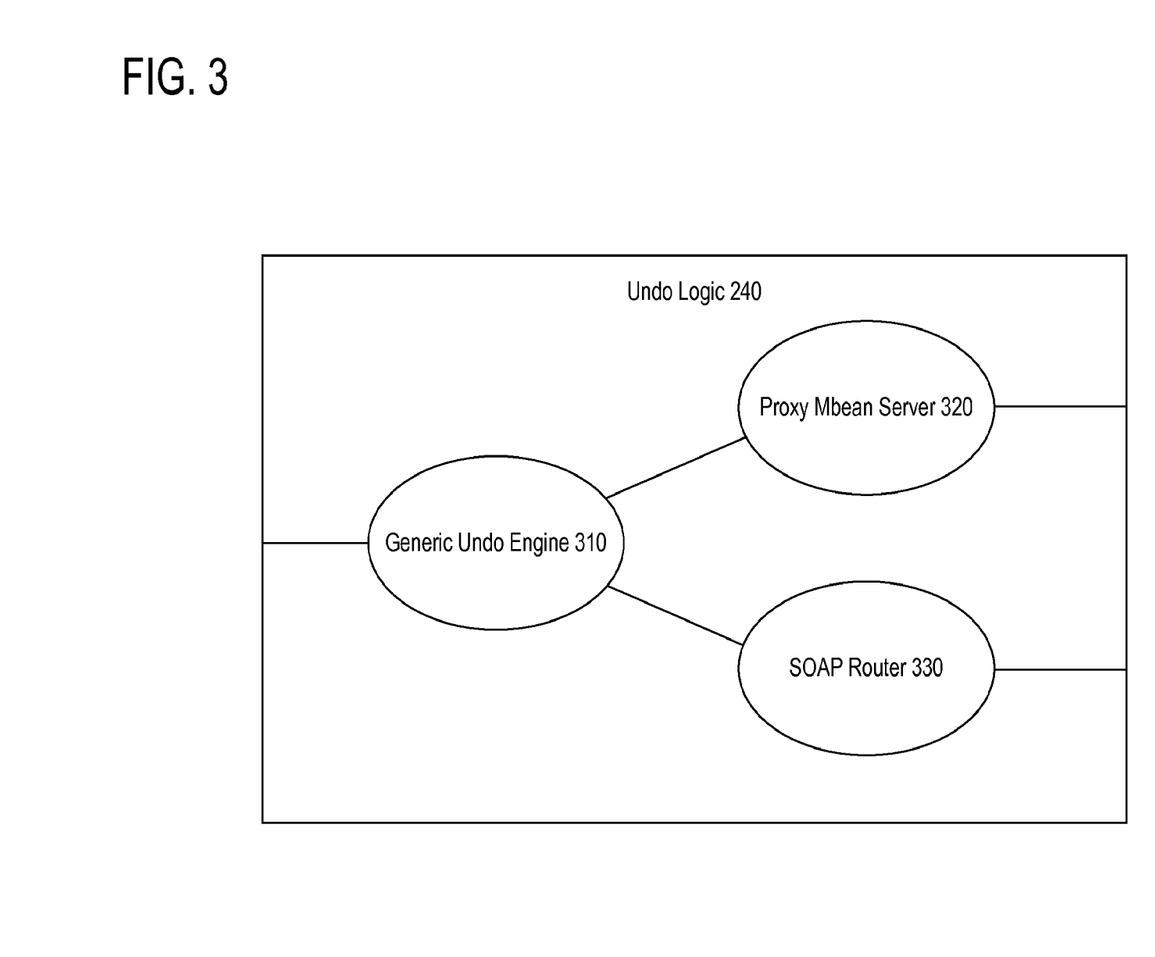
FIG. 3 illustrates a logical block diagram representing undo logic that may be implemented as part of an undo engine in an embodiment.

FIG. 3 illustrates a logical block diagram representing undo logic 240 that may be implemented as part of an undo engine in an embodiment. Specifically, FIG. 3 illustrates an embodiment where undo logic 240 is used to provide undo capabilities for an Mbean server and a SOAP server. A generic undo engine 310 is configured to determine which operations are performed by which service. For example, a business transaction may be identified by a session with identifier "k6oAOxCWZh." However, some of the operations associated with session k6oAOxCWZh may be performed by an Mbean server, while other operations associated with the same session may be performed by a SOAP server. Generic undo engine generates undo instruction metadata for identifying which entity the instructions should be sent to if an undo request is received. Proxy Mbean server 320 and SOAP router 330 each generate service-specific undo instructions associated with each session, and associate each instruction with sequencing information generated by generic undo engine 310.

The Mbean server and other adapters perform the commands that are issued to them. In addition, these adapters are used for 1) collection of data during the generation phase, and 2) executing operations or gathering data (for verification) during an actual undo phase.

3.0 Metadata-Driven Undo 3.1 Metadata

Metadata that logically maps resources to values is stored in a metadata repository. In an embodiment, the metadata repository is database 260, and the metadata is stored in database table metadata 262. Metadata may be automatically added to or removed from the metadata repository by metadata extraction logic 250. In an embodiment, metadata may be added to or removed from the metadata repository manually, through the use of command line operations, web-based tools, or by copying files that describe resource metadata, such as XML files, to the metadata repository. Each resource-metadata object that is stored in the metadata repository provides metadata for operations and other metadata in an embodiment. Resource metadata may be comprised of one or more of the following elements: operation metadata, parameter metadata, exception metadata, operation-to-operation relationships, and type metadata, to name a few.

Figure 4:
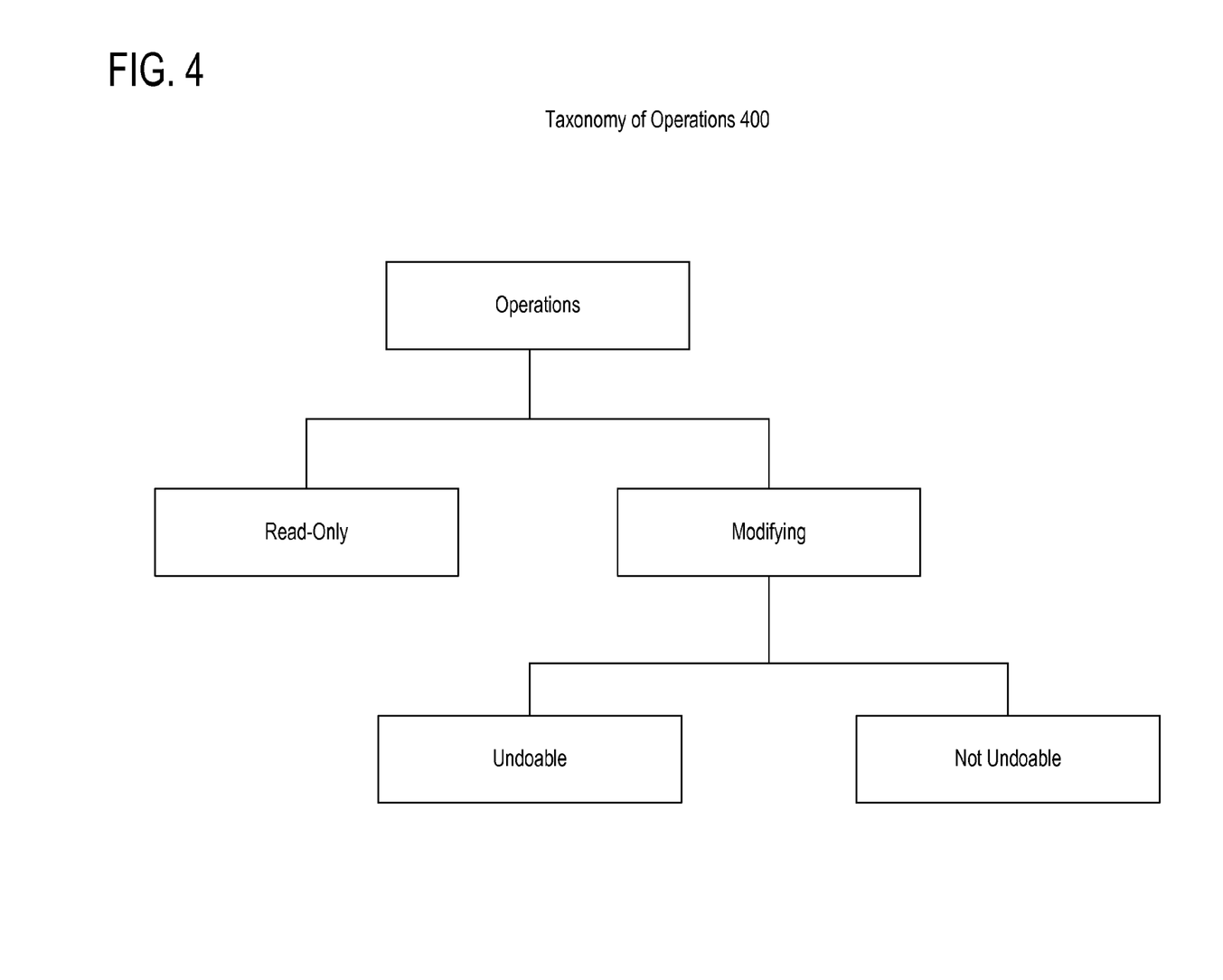
FIG. 4 illustrates a taxonomy of operations in an embodiment.

Operation metadata is metadata associated with a given operation, and provides the name of the operation. The name of the operation can be used to look up the metadata for an operation by name. Each operation metadata object is associated with a basic-kind attribute. In an embodiment, this attribute will have one of the following three values: {READ-ONLY, UNDOABLE, NOT-UNDOABLE}. If the basic-kind of an operation is READ-ONLY, then execution of this operation has no side-effects and causes no modifications. If the basic-kind of an operation is UNDOABLE, then execution of this operation can be undone. If the basic-kind of an operation is NOT-UNDOABLE, then execution of this operation may cause modifications but these cannot be undone. FIG. 4 illustrates a taxonomy of operations in an embodiment, showing that some operations are read-only, and other operations make modifications. Modifying operations are not always undoable, but undoable operations, and what operations are required to undo them, can be described in metadata.

In an embodiment, additional metadata associated with an operation may be used to look up the metadata for an operation. For example, the number and type of attributes of an operation may be used to look up metadata associated with polymorphic operations. Polymorphic operations may not be identified by name alone, because they represent distinct operations that have the same name. An example of a polymorphic operation is updatePersonInfo, with the following distinct operations: updatePersonInfo(String ssn,String name) and updatePersonInfo(String ssn,String name,String address). In an embodiment, operations that take an array of arguments, which may be identified positionally, can still be associated with metadata.

In an embodiment, Each operation can be associated with a set of parameter-metadata objects. Parameter metadata is metadata that describes the parameters of operations. Each parameter-metadata object has a name attribute that is provided by a string. The value of the name attribute provides the name of the parameter. A type attribute is also provided by a string. In addition, each parameter-metadata object may have a purpose attribute, provided by a string. While other string values can be used in different embodiments, the values are "KEY", "SELECTOR" or "DATA" are used in an embodiment. In other embodiments, parameters may be identified by position, and not by name.

In an embodiment, exception metadata may also be provided. Exception metadata may be used to define the actions that may be taken in the event that an exception is encountered. For example, if a business transaction or other transaction is being undone, and a particular operation causes an exception because an intervening operation has changed the value, several potential actions may be presented to the undo requestor. One option may be to proceed with the undo operation without changing the value back to the pre-transaction state, while another option may be to proceed with the undo operation, while changing the value to the pre-transaction state. Another option may be to stop the undo process altogether. Other options may be available, as defined in exception metadata.

Exception metadata may also be used during the generation of undo log entries. For example, if an update is about to be made to a target system, the undo engine 120 will prepare an entry for inclusion in the undo log, but will either not place in the undo log, or place it there tentatively. Next, if an exception occurs when the actual operation is performed against the target system, undo engine 120 must determine what to do. By default, if an exception occurs, undo engine 120 either 1) does not put the undo entry in the undo log, or 2) removes the entry from the undo log. If an exception has occurred, then the likely scenario is that nothing has happened. Also, an exception could be a generic exception that is not specific to the operation, such as an authorization denial. Therefore, if anything causes the operation against the target server to fail, the default action is to not store the entry, as the default interpretation is that nothing happened, so there is nothing to undo.

However, in some situations, an exception is raised, but either a) the exception is a warning, but the actual update DID take place, therefore the entry should be put into the undo log. In order to ensure that this happens, certain exception metadata is stored to instruct undo engine 120 that this exception is a warning, but does not mean that the update failed. Informed by this metadata, undo engine 120 will place the entry in the undo log (or keep it there, in an embodiment).

Exception metadata may also be used to manage partial updates. For example, an operation for assigning roles may be used to request three roles to be assigned to a user, resulting in the grant of only two of the three requested roles. Undo engine 120 requires a plan that will allow it to examine the exception returned, and determine from that exception what roles were actually assigned. That is, if the exception did not have a payload which enumerated the roles that were actually assigned, undo engine 120 might issue queries to determine if the roles that were supposed to be assigned were actually assigned. If any roles are missing, then it can be inferred by undo engine 120 that those roles were not assigned, and undo engine can alter the payload for the undo entry. For example, if roles A, B and C were to be assigned, but the user only has roles A and C, then it can be inferred that B did not get assigned. Hence the undo entry must be altered to reflect this reality.

Name maps are used in an embodiment to allow formal parameters that have the same meaning, but not identical names, to be correlated. For example, setJobCode(String username,int jobCode) and getJobCode(String name) could both exist at the same time. The formal parameters 'username' and 'name" are not identical, but they could have the same meaning A name map in the form of <operation-name.name>=<operation-name.name> is used. Using the example above, the name map would be setJobCode.username=getJobCode.name. Handling of names is important because an undo plan made up of undo instructions will, in many cases, need to associate the actual arguments of one operation with arguments of another. The undo plan needs to be aware of name maps so it can, if needed, match up arguments that have different names. Name maps allow this.

In an embodiment, metadata may be used to ensure that an undo log that was generated based on operations associated with a legacy version of a product may be used to undo a business transaction, even after the product has been upgraded. For example, transformation metadata may provide a mapping from an old operation identifier to a new operation identifier in an embodiment. Other ways of upgrade-proofing undo logs may also be used. For example, undo logs may be rewritten by an upgrade module in an embodiment, so that the entries associated with an upgraded product reference operations associated with the upgraded product. Entries may include metadata in an embodiment. For example, entries can include metadata that flags the entry as an entry that is affected by an upgrade of a target system or other intervening system.

3.2 Undo Log

Metadata is used to generate undo log entries, also referred to herein as undo instructions, that reverse the operations performed as part of a transaction, such as a business transaction. An undo log is an ordered list of entries. As used herein, the term "entry" is meant to refer to an identifiable set of data, and may include any amount of information. For example, entries may include metadata, entry boundary markers to identifiy the beginning or end of the entry, or business transaction boundary markers to identify the beginning or ending of a set of one or more entries that are associated with a particular business transaction. In an embodiment, an entry may either be an undo entry or a verification entry. The purpose of undo entries is to perform some update that is part of an overall set of undo actions. A verifier entry exists to verify that the data is as expected by Oracle Rewind. If data is not verified, then a write conflict has occurred. In an embodiment, an undo entry takes the following form:

{target-info, operation-name, [arguments]}

In an embodiment, verification entries may be flagged as verification steps are performed to keep track of the verification progress associated with a particular business transaction. In an embodiment, undo entries may be flagged as undo steps are performed to keep track of the undo progress associated with a particular business transaction. In the event of a failure that requires recovery, undo entry flags may be checked by undo engine 120 to determine the state of an undo operation that was not completed due to the failure.

Verification entries may also be used for recovery purposes. In an embodiment, verification entries may be used to determine whether a value is consistent with the successful execution of one or more operations, (i.e., an "expected" state). For example, there may be a verifier that indicates that the expected value is "3" for x, but the value is found to be "2", and "2" is the value for the undo action entry itself. On the other hand, if the current value is the value of "2", then we can reasonably conclude that the last update failed. If the entry is not consistent with success, and an undo policy or administrator action may be used to resolve the issue by, for example, setting the value to the correct value.

The data in the target-info field can be considered an opaque blob. The adapter associated with a target type can take the data in the target-info, along with the operation name-name and arguments and execute the action. Target-info could be an actual object reference, it could identify JDBC connection, or provide other information about the target. The target-info could be anything that allows the target to be identified and accessed. Undo logic uses this target-info to access to the target for read/write purposes. In an embodiment, the undo engine 120 relies on an adapter associated with the target, such as proxy Mbean server 320 and SOAP router 330, to interface with the target.

Undo log entries may be added to undo log data table 264 to create a virtual undo list. In an embodiment, undo log entries may be added to the end of the list. In this case, execution of undo instructions is performed from the end of the list to the beginning of the list if reverse-order restoration is desired. In other words, operations are undone in the opposite order in which they were originally applied in an embodiment. In another embodiment, operations are undone concurrently, or in a different order than the reverse order of the order in which they were originally executed.

Undo instructions are executed by undo logic 240, using the operation-name and arguments provided. Specifically, an adapter is used to execute instructions for each service. Examples of adapters are proxy Mbean server 320, SOAP router 330, or other proxies such as a proxy LDAP server. Each adapter returns runtime to the generic undo engine 310 after the execution of each instruction.

Verifier entries may be added to the undo log to allow undo logic 240 to determine, while executing undo instructions, whether the current state of the object being changed is consistent with the state of the object immediately after the initial change was made. In other words, a verifier entry, when executed, tells undo logic 240 whether a subsequent change has been made to an object. For a verifier entry, the action is executed against the adapter and a value will be returned, The verification entry holds an expected value as represented by 'expected-value'. The comparator provided is used to compare the actual value (the value returned from the adapter) against the expected value. If these values are equal according to the comparator, then the expected values have been verified, and there is no write conflict. If they are not, there is a write conflict. For example, if an attribute that has a value of "blue" is subsequently set to "red," a verifier entry is generated in the undo log. The verifier entry, when executed, allows undo engine 120 to verify that the value is "red" before setting the value back to blue, in case the value has been changed by a subsequent operation.

The following pseudo-code represents one undo-log execution strategy that may be used in an embodiment:

```
From end of undolog to its beginning
Begin
    Entry = get next entry
    If no entry
        exit loop
    If entry is a verifier
        begin
            Evaluate the verifier.
            If the expected value does not compare as equal to the actual
                value,Raise an undo exception
        end
    if entry is an action
        begin
            execute the action
            check the status of the action just executed
            if the action was not successfully executed
                raise an undo exception
        end
end
```

3.3 Undolets

Each operation-metadata that has a basic-kind of UNDO-ABLE is associated with an "undolet" in an embodiment. An undolet is an object that is capable of undoing operations that are associated with a particular operation type. For example, an undolet may be capable of undoing operations that are "setter" operations. In an embodiment, some undolets are capable of undoing specific operations, and are not associated with an operation type. In another embodiment, undolets may be associated with a subset of operations of a certain operation type, such as "setter" operations having only a target and a single argument (or parameter). In this case, multiple undolets may be associated with the "setter" operation type. Undoing the actions of an operation is performed by the logic in the associated undolet. In an embodiment, if an operation is not associated with an undolet, then the operation cannot be undone. Undolets are identified by their undolet identifier. For example, a name may be used as an undolet identifier. Hence operation-metadata for an operation named setColor might have an undolet identifier of "setter". A Java constructor such as Person(String name) for the class Person might have an undolet identifier of "constructor".

Undolets are implemented in undo logic 240, and may be separately stored in an undolet repository such as database 260 in an embodiment. When there is an invocation of an UNDOABLE operation, then the undolet referenced by that operation in its associated operation metadata in the metadata repository is called. Each undolet functions as an abstraction layer, mapping operations associated with the undolet's operation type to the actual operation required by the service. For example, the undolet turns the operation setColor( ) into a generic "setter" operation called setXXX( ) in an embodiment. This abstraction is possible because the behavior of all setter operations have similar properties, and can therefore be treated the same way by undo logic 240.

An undolet provides the capability to take an action with arguments against some target and generate appropriate undo entries and verify entries for that action. An undo plan may generate zero, one or more entries into the undo log. The number of entries, and the type of those entries (action versus verification) are completely up to the undo plan for the given type of operation (e.g., getter, setter, constructor, destructor, etc.). Each undo plan can gain access to the metadata for the given target. Using this metadata, the undo plan can then seek to generate undo entries that are appropriate. Additionally, queries may be used to gather data that may be useful for the undolet. The following is an example of an undolet:

```
rewind.addEntryToUndoLog(metadataId,  // key used to look up
                                      //   metadata
                         undoLogID,   // key for undo log
                         "setter",    // identifies the type of
```

```
                    operation
                 // thus allowing the actual
                    undo plan
                 // to be looked up
      "setX",   // the operation begin invoked
      args,     // the arguments of the
                    operation
      adapter,  // the adapter to use
      targetInfo // information to identify the
                    target);
```

For the "setter" operation type used in the example above, the undo plan could look up the value of the "getter" field for the setX operation. This data would be found in the metadata for this target type. The getter field would have a value of "getX", taking no arguments. The undo plan would then invoke a command on the adapter providing the target info, the operation ("getX") and the arguments (none). This invocation against the adapter could, for example, return zero. This undo plan can then look up the "setter" for this operation; that is, it can look up what operation it should use to write a value for an undo entry. Here the metadata for the operation "setX" could indicate that the setter is "setX" itself, hence an undo entry will be created with target-info, 'setX'. Thus, for each type of operation that is undoable undo engine 120, there is an undolet that specializes in generating the appropriate undo entry (or entries) for that action. The actual plan of an undolet may be relatively simple, as illustrated by the above description of an undolet for a setter, or more complex plans may be generated. What remains constant is that the undolet provides a plan that using metadata, data gathering and decision making, can appropriately generate zero, one or more undo entries for that action.

3.4 Performing Metadata-Driven Undo

In an embodiment, a metadata repository such as database 260 stores metadata that is associated with operations. For example, the metadata may identify the type of operation, such as whether the operation is a setter, getter, constructor, destructor, adder, remover, or other type of operation. Attributes associated with each operation are also stored in the metadata.

In an embodiment, each operation is associated with an undolet that includes instructions for generating undo entries. The undolet can handle any invocation on any operation belonging to the type of operation or operation category without regard to the target system in an embodiment. For example, the undolet for destructors will work for any destructor, including the destructor for an Mbean and the destructor for a web service. For example, an undolet for a destructor includes instructions for recreating that object and appropriately setting its attributes. For example, if a person object with a name "John" and hair-color "grey" is deleted, and this deletion operation has the operation type of 'destructor', then the undolet associated with the operation type 'destructor' could then collect the two values of these attributes, along with the appropriate operations to set them on the person object, and then the undolet could then generate an undo entry to recreate the person object. If ever executed in reverse order, then the person object would then be first created, and then the attribute values assigned, fully restoring the deleted object. An undolet for an operation type of 'setter' also works to generate entries for any operation of that operation type 'setter'. A setter undolet includes a reference to a setter operation, and includes an attribute that represents the object for which a value was changed, and another attribute that represents the value of that object prior to the change. In an embodiment, a setter undolet could look up metadata for the setter operation in the metadata repository, allowing the setter undolet to identify the associated getter operation that can be used to query for the current value of the attribute. The setter undolet would then use additional metadata, as needed, to determine what arguments (if any) would be used in this query. This constructed query could then be executed using the adapter to fetch this current value. The result of this query would provide the current value of this attribute. The setter undolet would then look up metadata for the setter operation in the metadata repository, so as to determine what operation would be used to this set this value. The setter undolet would then generate appropriate entries in the undo log, such as first generating an undo entry and then a verifier entry.

In an embodiment, undo logic 240 is configured to generate one or more entries in an undo log based on the metadata in the metadata repository and the undolet. An entry in the undo log may be based on an operation in a first request that is intercepted by the system, and may include a first attribute value for a first attribute associated with the operation. For example, the undolet for setColor(user123, red) is a setter undolet, which may be a generic setter undolet in an embodiment. Using the instructions in the undolet and the metadata, undo logic 240 generates an entry that stores the current Color value for user 123 (e.g., blue), and generates instructions for reverting back to that color if the color is currently set to red. Undo policies may allow for changing the color back to blue, even if the color has been changed to another color, such as yellow. The old color is determined before the new color is set by using a getter, such as getColor(user123). In this case, the verifier would verify that getColor(user123) returns "red," and the instructions in the undo log for undoing the operation may look like setColor(user123, blue). The verifier may be ignored by undo engine 120 if an undo policy dictates that the verifier should be ignored.

The pseudo code described in the paragraph above may be replaced with any instructions that accomplish the same task. For example, an SQL query or a URL that calls a web service and identifies the value to be verified and the value to be set may be used as an undo log entry in an embodiment. In an embodiment, these instructions are executed in response to receiving, at undo engine 120, a request to undo the get Color( ) operation.

Sessions are used in an embodiment to group operations together when the operations are associated with the same business transaction. For example, a first business transaction may include 20 operations and a second business transaction may include 15 operations. These operations may be executed on different target systems or servers, such as server 130. Each operation is received as part of a request that also identifies a session. For example, a request may include one or more operations to be executed, along with a session identifier value. The first business transaction and the second business transaction will have different session identifiers in an embodiment, even if undo engine 120 receives requests associated with the second business transaction between two other requests that are associated with the first business transaction. That is, the order in which a request is received does not necessarily affect which session the request and the operations in the request are associated with. In an embodiment, a single request may identify multiple operations that are associated by different corresponding session identifiers.

In an embodiment, different operations that are associated with the same business transaction are not necessarily associated with the same target system. An undo log is a storage mechanism for undo instructions, and may include multiple sets of instructions. Each set of instructions may be associated with a session. Each set of undo instructions may include instructions or entries that are directed to multiple target systems. When an undo command is invoked, all of the instructions associated with a session can be executed, even if the instructions span multiple target systems. The execution of one set of instructions associated with a first session does not cause the execution of instructions associated with a different session in an embodiment.

In an embodiment, session management logic 230 manages session information provided by clients, which can control the boundaries of a business transaction. In other words, a client may make a several requests that are all part of the same business transaction. Session management logic determines the boundaries of the business transaction by reading session identification information associated with the requests. A session identifier, as well as session boundary identifiers may be used in an embodiment to identify which requests are associated with a particular session. In addition, each request in the session may include a sequential number identifier, and the boundary requests may include additional metadata that defines the number or type of requests that may be received or that should have been received by undo engine 120. By identifying which session a request is associated with, the undo instructions generated based on the request can be placed in the proper undo log. The client may then request that a particular session be undone by identifying only the session.

As discussed above, embodiment may define an undo log entry that indicates the completed handling of a business operation, in respect to maintaining the undo log. For example, a setter undolet might generate an action to restore a variable to its previous value, and then also add a verifier entry; the undo engine would then add a business-operation-boundary entry to the undo log, signifying that the business operation has been completely handled in respect to maintaining the undo log. This business-operation-boundary entry signifies a boundary between these entries of a single business operation and those entries related to any other business operation.

Similarly, an embodiment may define a business-transaction-boundary entry for inclusion in undo logs. This business-transaction-boundary entry indicates that all operations of the business operation have been entered in the undo log. Information in the undo log that signifies the completion of a business transaction can be useful, particularly in recovering from severe failures, such as a power outage. If an undo log is detected that does not have a business-transaction-boundary entry, the absence of the business-transaction-boundary entry indicates that the overall business process was not successfully completed. An appropriate decision can then be made, based on this information, such as deciding to undo the all the changes of the incomplete business transaction.

Here is an example of an undo log with these additional types of entries. Each entry is labeled with a number, so that the text can refer to individual entries in this undo log.

---

{action[1] verifier[2] operation-boundary[3] action[4] action[5] action[6] verifier[7] operation-boundary[8] business-transaction[9]}

---

The presence of business-transaction[9] shows that the business transaction was completed. Now suppose that an administrator wanted to undo the actions of the last business operation individually. An embodiment could provide the ability to undo business operations, one at a time. Per the undo log above, an embodiment of this invention could verify system state using verifier[7], and then apply the actions of action[6], action[5] and action[4]. The presence of operation-boundary[3] signifies the start of entries for a different business operation, and so the undo engine would have undone the update of a single business operation. If desired, the undo engine could then proceed to undo the update of the first business operation, by first verifying system state with verifier[2], and applying action[1].

This example illustrates how, in general, clear boundaries in the undo log allow for the effects of individual business operations to be undone one at a time, from the last business operation, to the second-to-last, and so on. In an embodiment, other boundaries or markers may be implemented in the undo log. For example, "save points" may be added to the undo log. A save point may be added to allow undo operations to be performed up to that save point. This is particularly useful for testing purposes.

In an embodiment, a client may have explicit control or implicit control over undo sessions. For example, if a BPEL (Business Process Execution Language) engine were used, then the start of the process may start an undo session implicitly. If an undo command were issued inside the context of a BPEL process, then the whole process would be undone (or would be attempted to be undone). If a client API were used, then the client would provide instructions to start an undo session, end an undo session without executing an undo operation, and execute an undo operation within an undo session.

In an embodiment, undo engine 120 also uses session logic 230 to manage asynchronous requests between a client and a server. First, the client sends message to undo engine 120. Undo engine 120 takes the appropriate action (e.g. using undolet to generate undo entries in undo log). Undo engine 120 then makes an asynchronous request to the server. Undo engine 120 waits for a reply from server, such as a notification or callback indicating success or failure, or other information in the payload. Undo engine 120 takes appropriate action based on response, and returns a response to the client.

3.5 Undo Policies

In an embodiment, undo policies are used to handle anticipated scenarios that undo engine 120 may face. For example, an undo policy may be used to prevent an operation from taking place that cannot be undone, such as an operation of type NOT-UNDOABLE. By defining a policy that instructs undo engine 120 to prevent the execution of irreversible operations, additional safety is provided against potentially disastrous changes to a system that cannot be undone. Although this example discusses a policy that affects the initial operation, other undo policies may be implemented to handle scenarios that take place after a request has been fulfilled, or during an undo request.

Undo policies may be used in many situations, such as failure scenarios. For example, undo engine 120 may receive a request to undo all operations associated with session 123456, which includes six operations. Although the proper undo log entries exist for each of the operations, execution of undo instructions associated with one of the operations may fail. For example, a verification operation may fail because an unrelated request has caused a value associated with the undo session to be changed. Although a user interface may be used, as described above, to provide options for the user to select from, it may be more convenient for an administrator to define an undo policy that determines whether or not to continue with the undo request. For example, a policy may dictate that any failure occurring during an undo operation will cause the undo operation to stop and generate a user interface element asking the user if the operation should continue. A different policy may dictate that undo commands always be executed, and that failing verifiers be reported in a log file generated for that session.

Policies may also be used to dictate that all verifiers within an undo log be checked before the undo operation begins. For example, a request to undo all operations associated with session 123456 may be received by undo engine 120. In an embodiment, undo engine 120 first executes all verifier instructions to determine whether or not the current state of the data associated with the business transaction is consistent with the pre-transaction data, or that no other operation has changed the data (by checking timestamps associated with the data, for example). If the data is consistent, the policy may dictate that the undo operation continues. If the data is inconsistent, then the policy may dictate that the undo operation be aborted, and that the user be notified.

3.6 Suspending the Undo Engine

There are some instances in which suspending the operation of the undo engine may be useful. For example, a system administrator may be making changes to multiple systems, and may feel that he can operate without the safety provided by undo engine 120, and would prefer to free up resources used by undo engine 120 by disabling it. In an embodiment, undo engine 120 supports requests to suspend or turn off undo log generation, other features, or entirely shut down undo engine 120. The effects of being turned off may vary, depending on the implementation. If undo engine is implemented as an intermediary, then it will simply take each request and pass it on to the target. If undo engine is implemented as an embedded footprint, it will alter its logic so that the embedded undo engine 120 component is never called at all. In an embodiment, the entire undo engine 120 need not be suspended to suspend a portion of undo engine 120. Any portion of undo engine 120 may be suspended individually for any reason. For example, it may be appropriate to suspend all verification mechanisms in a single user/non-concurrent environment, because a user may feel comfortable trading the verification steps for a performance increase when there is little or no chance intervening changes being made to the system.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
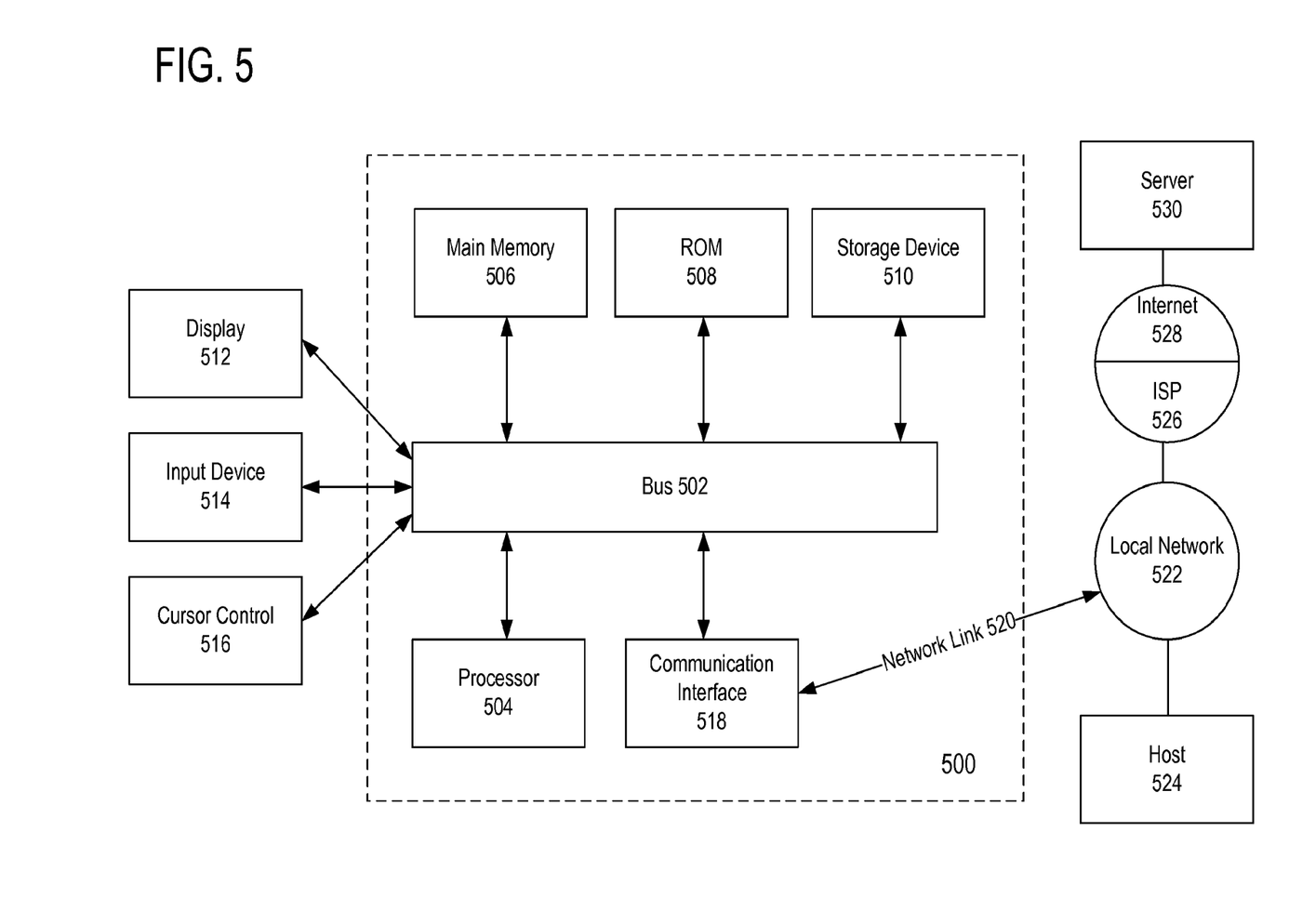
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   for each particular request of a plurality of requests that are associated with a particular session, (a) receiving the particular request at a server, (b) generating particular undo instructions for reversing effects of performance of the particular request, (c) storing the particular undo instructions in association with metadata that identify the particular session, and (d) committing, into a database, independently of other transactions that execute other requests of the plurality of requests, a particular transaction that executes the particular request;
   after committing, into the database, transactions that execute the requests of the plurality of requests, receiving, at the server, an undo request to undo operations associated with the particular session; and
   in response to receiving the undo request, executing all undo instructions that are associated with metadata that identify the particular session.

2. The computer-implemented method of claim 1, wherein executing all undo instructions that are stored in association with the particular session comprises committing, to the database, additional transactions that reverse effects of the committed transactions that executed the requests of the plurality of requests.

3. The computer-implemented method of claim 1, wherein receiving the particular request at the server comprises receiving the particular request as a web service request that is separate from other web service requests that specify other requests of the plurality of requests.

4. The computer-implemented method of claim 1, wherein committing the particular transaction into the database causes a particular value in the database to be updated from a first value to a second value; and wherein generating the particular undo instructions comprises generating a database transaction which, when committed into the database, causes the particular value to be updated from the second value to the first value.

5. The computer-implemented method of claim 1, wherein committing the particular transaction into the database causes a particular row to be inserted into a database table; and wherein generating the particular undo instructions comprises generating a database transaction which, when committed into the database, causes the particular row to be deleted from the database table.

6. The computer-implemented method of claim 1, wherein committing the particular transaction into the database is performed by a particular service of a plurality of services that include other services that commit, into the database, the other transactions that execute the other requests of the plurality of requests; wherein storing the particular undo instructions comprises storing the particular undo instructions in association with metadata that identify the particular service; and wherein executing all undo instructions that are associated with metadata that identify the particular session comprises sending the particular undo instructions to a proxy adapter for the particular service that is identified by the metadata that are stored in association with the particular undo instructions.

7. The computer-implemented method of claim 1, further comprising:
   for each particular operation type of a plurality of operation types, storing an association between the particular operation type and a particular object that includes a particular method for generating undo instructions for operations of the particular operation type;
   wherein generating the particular undo instructions for reversing the effects of the performance of the particular request comprises (1) selecting, based on an operation type of an operation specified by the particular request, the particular object from a plurality of objects that include methods for generating undo instructions and (2) invoking the particular method of the particular object to generate the particular undo instructions.

8. The computer-implemented method of claim 1, wherein:
the undo request is caused by an invocation of an undo policy that specifies that all particular operations associated with a session are to be undone if a timeout occurs during one of the particular operations; and
the invocation of the undo policy is performed in response to a timeout occurring during execution of an operation associated with the particular session.

9. A computer-readable storage memory storing computer-executable instructions which are executable by one or more processors to cause the one or more processors to perform actions, and wherein the computer-executable instructions comprise:
instructions to cause, for each particular request of a plurality of requests that are associated with a particular session, the one or more processors to (a) receive the particular request, (b) generate particular undo instructions for reversing effects of performance of the particular request, (c) store the particular undo instructions in association with metadata that identify the particular session, and (d) commit, into a database, independently of other transactions that execute other requests of the plurality of requests, a particular transaction that executes the particular request;
instructions to cause the one or more processors to receive, after committing, into the database, transactions that execute the requests of the plurality of requests, an undo request to undo operations associated with the particular session; and
instructions to cause the one or more processors to execute, in response to receiving the undo request, all undo instructions that are associated with metadata that identify the particular session.

10. The computer-readable storage memory of claim 9, wherein the instructions to cause the one or more processors to execute all undo instructions that are stored in association with the particular session comprises instructions to cause the one or more processors to commit, to the database, additional transactions that reverse effects of the committed transactions that executed the requests of the plurality of requests.

11. The computer-readable storage memory of claim 9, wherein the instructions to cause the one or more processors to receive the particular request at the server comprise instructions to cause the one or more processors to receive the particular request as a web service request that is separate from other web service requests that specify other requests of the plurality of requests.

12. The computer-readable storage memory of claim 9, wherein the instructions to cause the one or more processors to commit the particular transaction into the database cause a particular value in the database to be updated from a first value to a second value; and wherein the instructions to cause the one or more processors to generate the particular undo instructions comprise instructions to cause the one or more processors to generate a database transaction which, when committed into the database, causes the particular value to be updated from the second value to the first value.

13. The computer-readable storage memory of claim 9, wherein the instructions to cause the one or more processors to commit the particular transaction into the database cause a particular row to be inserted into a database table; and wherein the instructions to cause the one or more processors to generate the particular undo instructions comprise instructions to cause the one or more processors to generate a database transaction which, when committed into the database, causes the particular row to be deleted from the database table.

14. The computer-readable storage memory of claim 9, wherein the instructions to cause the one or more processors to commit the particular transaction into the database comprise instructions to cause the particular transaction to be committed into the database by a particular service of a plurality of services that include other services that commit, into the database, the other transactions that execute the other requests of the plurality of requests; wherein the instructions to cause the one or more processors to store the particular undo instructions comprise instructions that cause the one or more processors to store the particular undo instructions in association with metadata that identify the particular service; and wherein the instructions to cause the one or more processors to execute all undo instructions that are associated with metadata that identify the particular session comprise instructions to cause the one or more processors to send the particular undo instructions to a proxy adapter for the particular service that is identified by the metadata that are stored in association with the particular undo instructions.

15. The computer-readable storage memory of claim 9, wherein the computer-executable instructions further comprise:
instructions to cause the one or more processors to store, for each particular operation type of a plurality of operation types, an association between the particular operation type and a particular object that includes a particular method for generating undo instructions for operations of the particular operation type;
wherein the instructions to cause the one or more processors to generate the particular undo instructions for reversing the effects of the performance of the particular request comprise (1) instructions to cause the one or more processors to select, based on an operation type of an operation specified by the particular request, the particular object from a plurality of objects that include methods for generating undo instructions and (2) instructions to cause the one or more processors to invoke the particular method of the particular object to generate the particular undo instructions.

16. A system comprising:
one or more processors; and
a computer-readable storage memory storing instructions to cause the one or more processors to:
for each particular request of a plurality of requests that are associated with a particular session, (a) receive the particular request, (b) generate particular undo instructions for reversing effects of performance of the particular request, (c) store the particular undo instructions in association with metadata that identify the particular session, and (d) commit, into a database, independently of other transactions that execute other requests of the plurality of requests, a particular transaction that executes the particular request;
receive, after committing, into the database, transactions that execute the requests of the plurality of requests, an undo request to undo operations associated with the particular session; and
execute, in response to receiving the undo request, all undo instructions that are associated with metadata that identify the particular session.

17. The system of claim 16, wherein executing all undo instructions that are stored in association with the particular session comprises committing, to the database, additional transactions that reverse effects of the committed transactions that executed the requests of the plurality of requests.

18. The system of claim 16, wherein receiving the particular request comprises receiving the particular request as a web service request that is separate from other web service requests that specify other requests of the plurality of requests.

19. The system of claim 16, wherein committing the particular transaction into the database causes a particular value in the database to be updated from a first value to a second value; and wherein generating the particular undo instructions comprises generating a database transaction which, when committed into the database, causes the particular value to be updated from the second value to the first value.

20. The system of claim 16, wherein committing the particular transaction into the database causes a particular row to be inserted into a database table; and wherein generating the particular undo instructions comprises generating a database transaction which, when committed into the database, causes the particular row to be deleted from the database table.

21. The system of claim 16, wherein committing the particular transaction into the database is performed by a particular service of a plurality of services that include other services that commit, into the database, the other transactions that execute the other requests of the plurality of requests; wherein storing the particular undo instructions comprises storing the particular undo instructions in association with metadata that identify the particular service; and wherein executing all undo instructions that are associated with metadata that identify the particular session comprises sending the particular undo instructions to a proxy adapter for the particular service that is identified by the metadata that are stored in association with the particular undo instructions.

* * * * *

UNITED STATES PATENT AND TRADEMARK OFFICE
CERTIFICATE OF CORRECTION

PATENT NO.        : 9,075,750 B2                           Page 1 of 1
APPLICATION NO.   : 13/911875
DATED             : July 7, 2015
INVENTOR(S)       : Gower It is certified that error appears in the above-identified patent and that said Letters Patent is hereby corrected as shown below:

In the Specification:

In column 8, line 9, delete "'"name"'" and insert -- 'name' --, therefor.

In column 8, line 10, delete "meaning" and insert -- meaning. --, therefor.

In column 8, line 43, delete "identifiy" and insert -- identify --, therefor.

Signed and Sealed this
Ninth Day of August, 2016

Michelle K. Lee
*Director of the United States Patent and Trademark Office*